(12) United States Patent
Park

(10) Patent No.: US 9,836,206 B2
(45) Date of Patent: Dec. 5, 2017

(54) METHOD AND APPARATUS FOR MATCHING INPUT OF APPLICATION TO OUTPUT OF ANOTHER APPLICATION

(71) Applicant: Samsung Electronics Co., Ltd, Gyeonggi-do (KR)

(72) Inventor: Chun-Ho Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 846 days.

(21) Appl. No.: 14/076,040

(22) Filed: Nov. 8, 2013

(65) Prior Publication Data
US 2014/0137021 A1 May 15, 2014

(30) Foreign Application Priority Data

Nov. 9, 2012 (KR) ........................ 10-2012-0126623

(51) Int. Cl.
- *G06F 3/00* (2006.01)
- *G06F 3/048* (2013.01)
- *G06F 3/0486* (2013.01)
- *G06F 3/0484* (2013.01)

(52) U.S. Cl.
CPC ........ *G06F 3/0486* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 5,261,043 A * | 11/1993 | Wolber | ..................... | G06F 8/34 715/763 |
| 5,386,568 A * | 1/1995 | Wold | ........................ | G06F 8/36 715/769 |
| 5,734,905 A * | 3/1998 | Oppenheim | .......... | G06F 3/0486 719/315 |
| 6,166,736 A * | 12/2000 | Hugh | .................... | G06F 3/0481 715/777 |
| 6,324,498 B1* | 11/2001 | Wajda | ....................... | G06F 8/34 703/25 |
| 6,836,841 B1* | 12/2004 | Wu | ............................ | G06F 8/36 712/220 |
| 6,986,145 B2* | 1/2006 | Gangopadhyay | ..... | G06F 9/4443 707/999.102 |
| 7,519,917 B2* | 4/2009 | Lewis-Bowen | ....... | G06F 3/0482 714/21 |
| 8,117,555 B2* | 2/2012 | Samson | ................ | G06F 3/0481 715/762 |
| 9,230,358 B2* | 1/2016 | Chmiel | ................... | G06T 13/80 |
| 2004/0097244 A1 | 5/2004 | Yamazaki et al. | | |
| 2005/0223395 A1* | 10/2005 | Maeta | ....................... | G06F 9/54 719/331 |
| 2005/0270307 A1* | 12/2005 | Jacques Brouaux | . | G06F 3/0481 345/619 |
| 2006/0064674 A1* | 3/2006 | Olson, Jr. | ................. | G06F 8/38 717/113 |

(Continued)

*Primary Examiner* — Yongjia Pan

(57) ABSTRACT

A method for matching an input of an application to an output of another application includes matching an input of a first application to an output of a second application, and displaying input object information of the first application through the second application, based on the matched input and output of the first and second applications.

12 Claims, 9 Drawing Sheets

(56) References Cited

U.S. PATENT DOCUMENTS

| | | | | |
|---|---|---|---|---|
| 2006/0218499 A1* | 9/2006 | Matthews | G06F 17/30616 | 715/765 |
| 2007/0157096 A1* | 7/2007 | Keren | G06F 8/34 | 715/760 |
| 2008/0141153 A1* | 6/2008 | Samson | G06F 3/0481 | 715/769 |
| 2008/0229280 A1* | 9/2008 | Stienhans | G06F 8/34 | 717/107 |
| 2009/0019385 A1* | 1/2009 | Khatib | G06F 9/4443 | 715/765 |
| 2010/0058182 A1* | 3/2010 | Jung | G06F 3/04883 | 715/702 |
| 2010/0138763 A1* | 6/2010 | Kim | G06F 1/1626 | 715/765 |
| 2010/0175011 A1* | 7/2010 | Song | G06F 3/0486 | 715/769 |
| 2010/0229100 A1* | 9/2010 | Miller | G06F 9/485 | 715/745 |
| 2010/0248788 A1* | 9/2010 | Yook | G06F 3/0481 | 455/566 |
| 2010/0333008 A1* | 12/2010 | Taylor | G06F 9/543 | 715/769 |
| 2012/0005577 A1* | 1/2012 | Chakra | G06F 3/0486 | 715/702 |
| 2012/0151400 A1* | 6/2012 | Hong | G06F 3/04817 | 715/769 |
| 2012/0159387 A1* | 6/2012 | Oh | G06F 3/04817 | 715/808 |
| 2013/0038636 A1* | 2/2013 | Fujiwaka | G06F 1/1643 | 345/681 |
| 2013/0080932 A1* | 3/2013 | Sirpal | G06F 3/1438 | 715/761 |
| 2013/0083059 A1* | 4/2013 | Hwang | G06F 11/323 | 345/629 |
| 2013/0187861 A1* | 7/2013 | Lavallee | G06F 9/543 | 345/173 |
| 2013/0219341 A1* | 8/2013 | Lee | G06F 3/0482 | 715/835 |

* cited by examiner

METHOD AND APPARATUS FOR MATCHING INPUT OF APPLICATION TO OUTPUT OF ANOTHER APPLICATION

CROSS-REFERENCE TO RELATED APPLICATION(S) AND CLAIM OF PRIORITY

The present application is related to and claims priority under 35 U.S.C. §119(a) to a Korean Patent Application No. 10-2012-0126623 filed in the Korean Intellectual Property Office on Nov. 9, 2012, the contents of which are herein incorporated by reference.

TECHNICAL FIELD

The present disclosure relates to a method for matching an input of an application to an output of another application, and the electronic device thereof.

BACKGROUND

With the growth of technology, the multi-function convergence of camera, MPEG Audio Layer-3 (MP3), Digital Multimedia Broadcasting (DMB), Internet, and the like has been carried out within one smartphone. The multi-function convergence of a smartphone requires multitasking support seamlessly simultaneously working different functions realizable in the smartphone. Further, a current smartphone supports multi-core and multitasking technologies.

For instance, in the conventional art, a history view application had a simple object for showing previously executed applications to a user to help the user to select one of the previously executed applications.

However, a function of selecting and maintaining only previously executed applications in a history view application is a failure of the sufficient utilization of a system resource of increasing various kinds of applications in the light of the system resource.

SUMMARY OF THE DISCLOSURE

To address the above-discussed deficiencies of the prior art, it is a primary object to provide a method and apparatus for matching an input of an application to an output of another application in an electronic device.

Another aspect of the present disclosure is to provide a method and apparatus for using matched applications in an electronic device.

A further aspect of the present disclosure is to provide a user interface for matching an input of an application to an output of another application in an electronic device.

The above aspects are achieved by providing a method and apparatus for matching an input of an application to an output of another application, and a method and apparatus for using matched applications in an electronic device.

According to one aspect of the present disclosure, a method for matching an input of an application to an output of another application in an electronic device is provided. The method includes matching an input of a first application to an output of a second application, and displaying input object information of the first application through the second application, based on the matched input and output of the first and second applications.

According to another aspect of the present disclosure, an electronic device includes a touch screen for detecting the presence and location of a touch, one or more processors for executing computer programs, a memory for storing data and instructions, and one or more programs stored in the memory and configured to be executed by the one or more processors. The program includes an instruction of matching an input of a first application to an output of a second application, and displaying input object information of the first application through the second application, based on the matched input and output of the first and second applications.

According to a further aspect of the present disclosure, a method for displaying applications in an electronic device is provided. The method includes selecting at least two or more applications, executing the at least two or more applications, and displaying the executed at least two or more applications on divided screens.

According to yet another aspect of the present disclosure, an electronic device includes one or more processors for executing computer programs, a memory for storing data and instructions, and one or more programs stored in the memory and configured to be executed by the one or more processors. The program includes an instruction of selecting at least two or more applications, executing the at least two or more applications, and displaying the executed at least two or more applications on divided screens.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Preferred embodiments of the present disclosure will be described herein below with reference to the accompanying drawings. In the following description, well-known functions or constructions are not described in detail since they would obscure the disclosure in unnecessary detail. And, terms described below, which are defined considering functions in the present disclosure, can be different depending on user and operator's intention or practice. Therefore, the terms should be defined on the basis of the disclosure throughout this specification.

Below, the present disclosure describes a method and apparatus for matching an input of an application to an output of another application, and a method and apparatus for using matched applications in an electronic device.

In this specification, gesture represents making a touch pattern on a touch screen of an electronic device. Touch is carried out on the touch screen of the electronic device by means of an external input means such as a user's finger or a stylus pencil and the like. Gesture represents carrying out a drag of a predetermined pattern with maintaining a touch on the touch screen. According to cases, the gesture can represent a motion of touch-and-drag to touch release.

Figure 1:
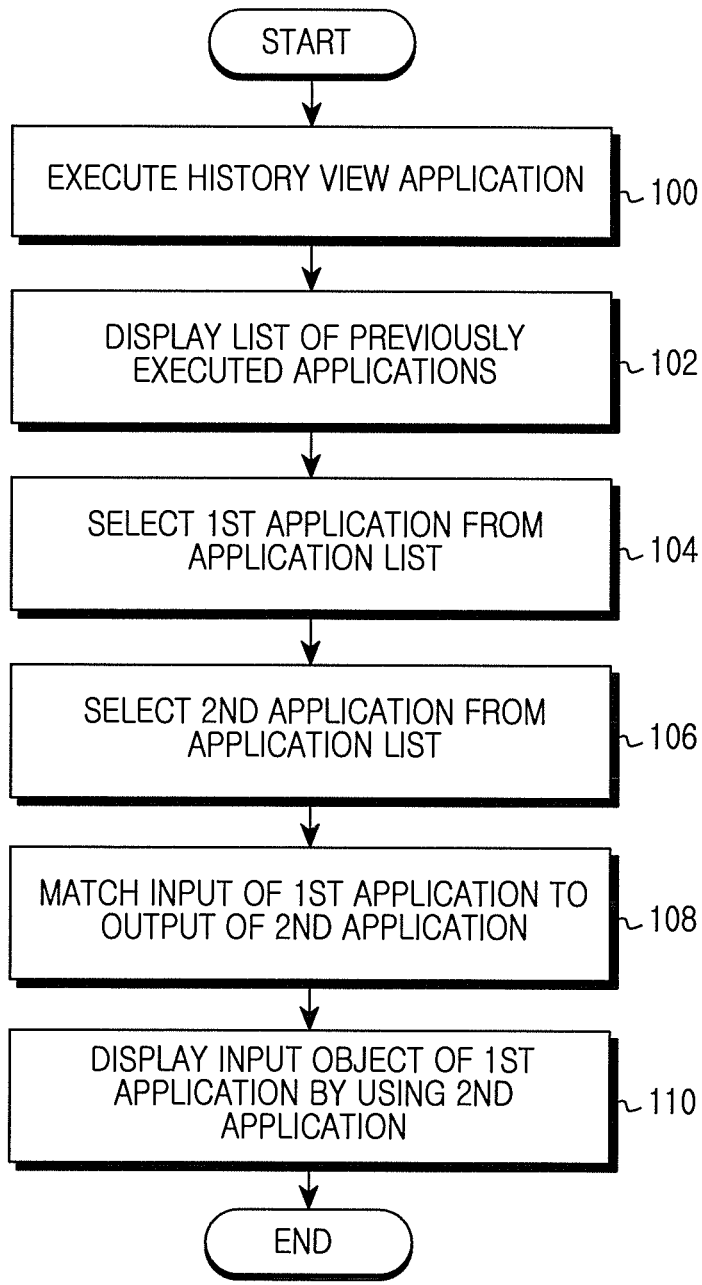
FIG. 1 is a flowchart illustrating a procedure for matching an input of an application to an output of another application according to the first embodiment of the present disclosure.

FIG. 1 is a flowchart illustrating a procedure for matching an input of an application to an output of another application according to the first embodiment of the present disclosure.

Referring to FIG. 1, in step 100, an electronic device executes a history view application. The history view application is a program for allowing a user to identify use histories and work content which are automatically stored when he/she uses applications installed in the electronic device. For example, the user can identify in detail which work the user did using the Internet, which file the user opened and closed, which file the user executed, and the like.

Next, in step 102, the electronic device displays a list of previously used applications. The application list can be shown in a text form or presented in an icon form. At this time, if there are many previously used applications, the application list cannot be fully presented on one screen, so the user uses a scroller, or moves the screen in a page unit.

After that, in step 104, the electronic device selects a first application from the application list according to a user's input. For example, when the user touches one application that is in the application list, the first application is selected. According to another embodiment, the user can select the first application through a menu button.

Next, in step 106, the electronic device selects a second application from the application list according to a user's input. For example, when the user touches another application that is in the application list, the second application is selected. According to another embodiment, the user can select the second application through the menu button.

After that, in step 108, the electronic device matches an input of the first application to an output of the second application according to a user's input. Alternately, the electronic device matches an output of the first application to an input of the second application according to a user's gesture.

For instance, the user drags a first application execution icon and drops the first application execution icon on a second application execution icon such that the first application execution icon is partially or fully overlapped with the second application execution icon (referring to FIG. 6A below). The drag is a motion of selecting and dragging an object, and the drop is a motion of putting a dragged icon down in a desired location.

In another instance, the user can use a gesture of dragging the first application execution icon and then tapping the second application execution icon with the first application execution icon at least once or more (referring to FIG. 6B below).

However, in the present disclosure, the motion of dragging one icon and dropping one icon on another icon or the motion of dragging one icon and then tapping another icon with one icon does not intend to limit the spirit and scope of the disclosure. It is obvious that other various methods and gestures can be used. For example, the user can match an output of the first application to an input of the second application through the menu button.

After that, in step 110, the electronic device displays an input object of the first application by using the second application.

Figure 8:
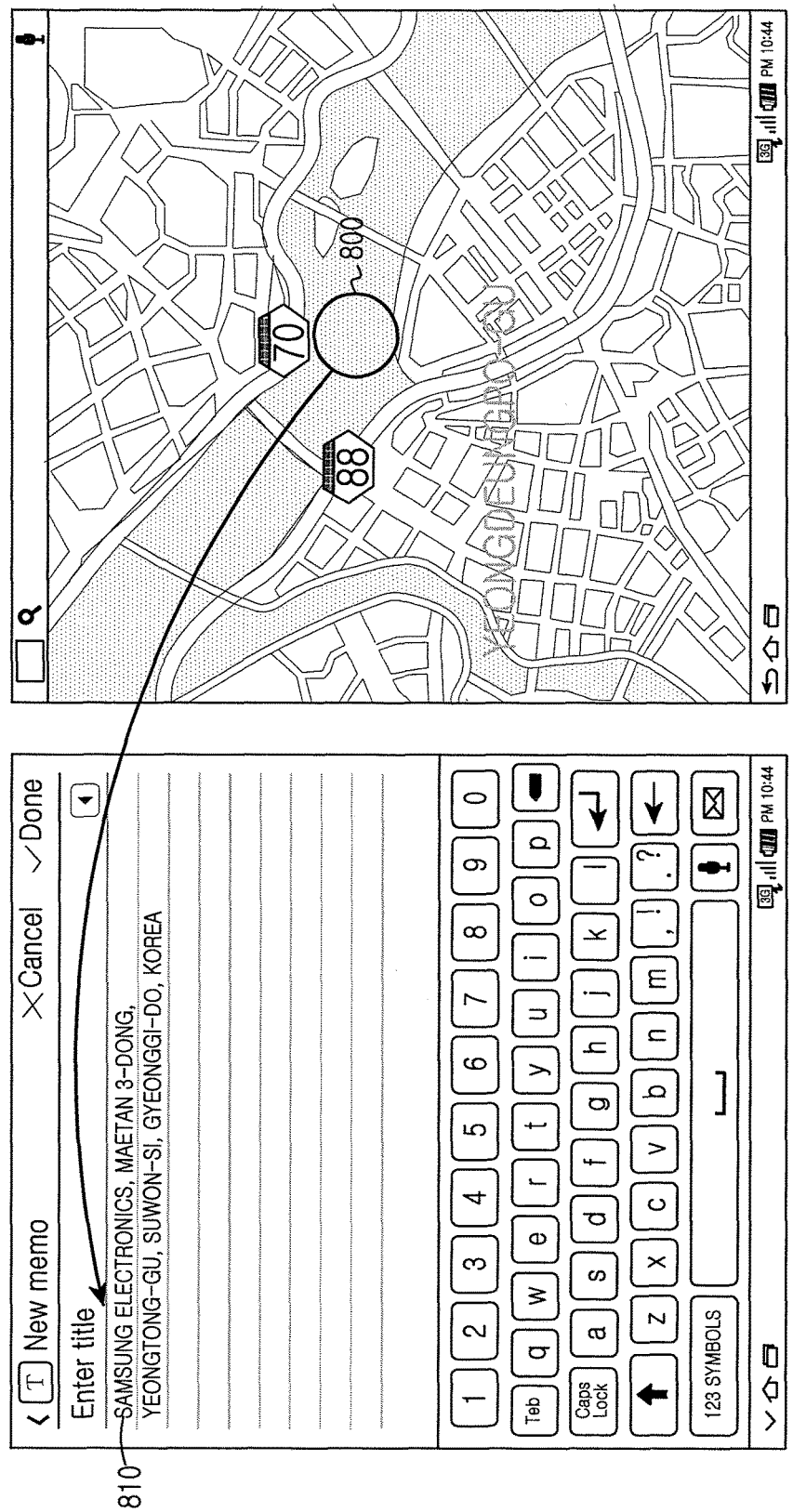
FIG. 8 illustrates an example in which an input of a map application has been matched to an output of a memo application according to one embodiment of the present disclosure.

For example, when the user inputs a gesture command (e.g., a motion of dragging one icon and dropping one icon on another icon or a motion of dragging one icon and then tapping another icon with one icon) for matching the input of the first application to the output of the second application, the whole screen is divided into a first screen and a second screen, and a first application execution screen is displayed on the first screen, and a second application execution screen is displayed on the second screen (referring to FIG. 8). At this time, information about a corresponding input object of the first application is displayed through the second application.

Here, the first application and the second application, which are within a history view, are previously executed applications, and the use histories of the first application and the second application have been automatically stored. That is, a corresponding input object of the first application can be the same as the use history of the first application or can be processed information of the use history.

Next, the electronic device terminates the procedure of the present disclosure.

In FIG. 1 above, a description has been made for a process of selecting a first application and a second application and then, matching an input of the first application to an output of the second application. Alternatively, in another embodiment, the present disclosure can perform a process in which a user drags a first application execution icon on a screen and drops the first application execution icon on a second application execution icon or taps the first application execution icon to the second application execution icon, directly without performing a process of selecting the first application and the second application (referring to FIGS. 5A and 5B below).

Figure 2:
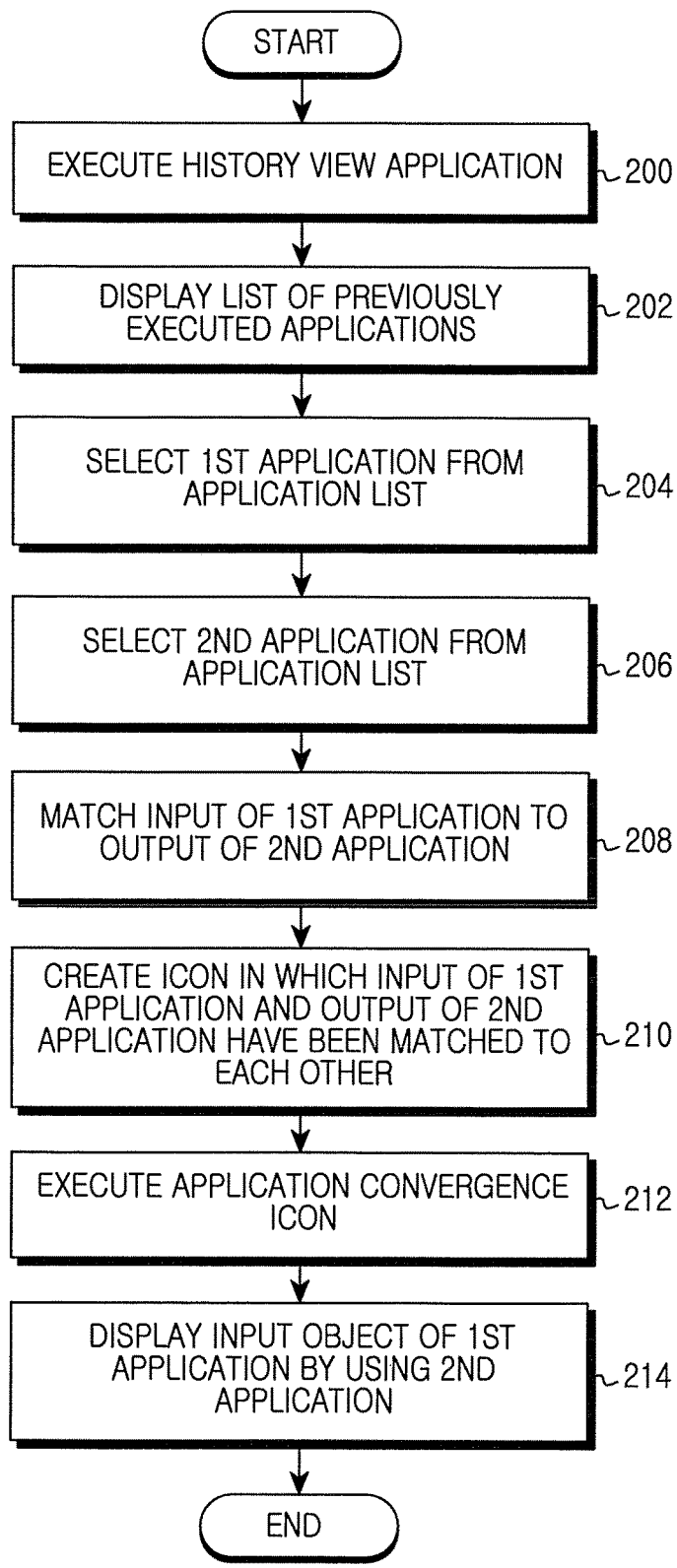
FIG. 2 is a flowchart illustrating a procedure for matching an input of an application to an output of another application according to the second embodiment of the present disclosure.

FIG. 2 is a flowchart illustrating a procedure for matching an input of an application to an output of another application according to the second embodiment of the present disclosure.

Referring to FIG. 2, in step 200, an electronic device executes a history view application. The history view application is a program for allowing a user to identify use histories and work content which are automatically stored when he/she uses applications installed in the electronic device. For example, the user can identify in detail which work the user did using the Internet, which file the user opened and closed, which file the user executed, and the like.

Next, in step 202, the electronic device displays a list of previously used applications. The application list can be shown in a text form or presented in an icon form. At this time, if there are many previously used applications, the application list cannot be fully presented on one screen, so the user uses a scroller, or moves the screen in a page unit.

After that, in step 204, the electronic device selects a first application from the application list according to a user's input. For example, when the user touches one application that is in the application list, the first application is selected. According to another embodiment, the user can select the first application through a menu button.

Next, in step 206, the electronic device selects a second application from the application list according to a user's input. For example, when the user touches another application that is in the application list, the second application is selected. According to another embodiment, the user can select the second application through the menu button.

After that, in step 208, the electronic device matches an input of the first application to an output of the second application according to a user's input. Alternately, the electronic device matches an output of the first application to an input of the second application according to a user's gesture.

For instance, the user drags a first application execution icon and drops the first application execution icon on a second application execution icon such that the first application execution icon is partially or fully overlapped with the second application execution icon (referring to FIG. 6A below). The drag is a motion of selecting and dragging an object, and the drop is a motion of putting a dragged icon down in a desired location.

In another instance, the user can use a gesture of dragging the first application execution icon and then tapping the second application execution icon with the first application execution icon at least once or more (referring to FIG. 6B below).

However, in the present disclosure, the motion of dragging one icon and dropping one icon on another icon or the motion of dragging one icon and then tapping another icon with one icon does not intend to limit the scope of the disclosure. It is obvious that other various methods and gestures can be used. For example, the user can match an output of the first application to an input of the second application through the menu button.

After that, in step 210, the electronic device creates an icon (hereinafter, referred to as an "application convergence icon") in which the input of the first application and the output of the second application have been matched to each other. Here, the application convergence icon can be an icon of a state in which the first application execution icon and the second application execution icon are stuck or overlapped with each other. Alternately, the application convergence icon can be a new icon selected by the user apart from the first application execution icon and the second application execution icon.

After that, when the user executes the application convergence icon in step 212, in step 214, the electronic device displays an input object of the first application by using the second application.

For example, when the user inputs a gesture command (e.g., a motion of dragging one icon and dropping one icon on another icon or a motion of dragging one icon and then tapping another icon with one icon) for matching the input of the first application to the output of the second application, the whole screen is divided into a first screen and a second screen, and a first application execution screen is displayed on the first screen, and a second application execution screen is displayed on the second screen (referring to FIG. 8). At this time, information about a corresponding input object of the first application is displayed through the second application.

Here, the first application and the second application, which are within a history view, are previously executed applications, and the use histories of the first application and the second application have been automatically stored. That is, a corresponding input object of the first application can be the same as the use history of the first application or can be processed information of the use history.

Next, the electronic device terminates the procedure of the present disclosure.

In FIG. 2 above, a description has been made for a process of selecting a first application and a second application and then, matching an input of the first application to an output of the second application. Alternatively, in another embodiment, the present disclosure can perform a process in which a user drags a first application execution icon on a screen and drops the first application execution icon on a second application execution icon or taps the first application execution icon to the second application execution icon, directly without performing a process of selecting the first application and the second application (referring to FIGS. 5A and 5B below).

According to further embodiment, the present disclosure can select at least two or more applications through corresponding user input or menu selection and then display the executed two or more applications on divided screens, without a process of matching an input of a first application to an output of a second application in FIG. 1 or FIG. 2 above. At this time, the screen is divided in proportion to the number of the selected and executed applications.

Figure 3:
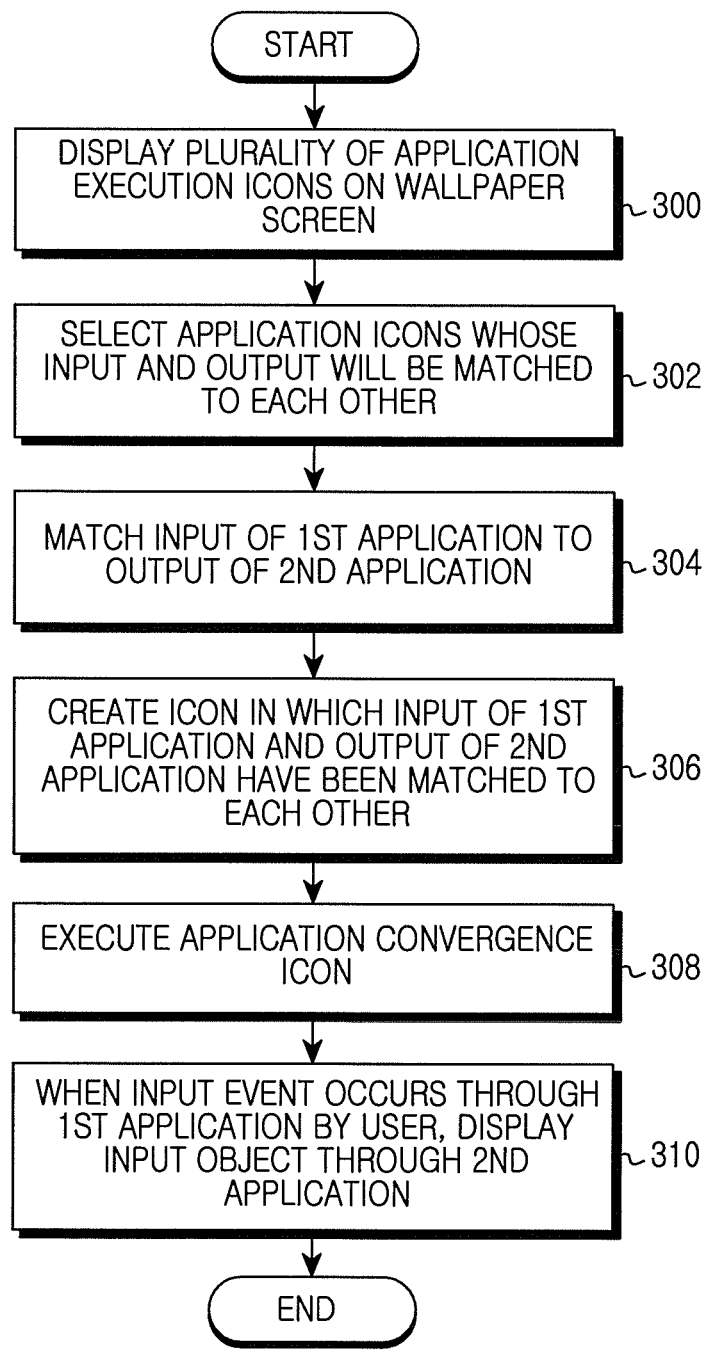
FIG. 3 is a flowchart illustrating a procedure for matching an input of an application to an output of another application according to the third embodiment of the present disclosure.

FIG. 3 is a flowchart illustrating a procedure for matching an input of an application to an output of another application according to the third embodiment of the present disclosure.

Referring to FIG. 3, in step 300, an electronic device displays a plurality of application execution icons on a wallpaper screen.

The application execution icons being on the wallpaper screen are for running applications aside from the use histories and work content of previously executed applications, and icons being on a screen within a history view application are for running applications together with the last work content of previously executed applications.

Next, in step 302, the electronic device selects two application execution icons whose input and output will be matched to each other, according to a user's input. For example, when a user touches two application execution icons in a list of application execution icons shown on the screen, the two application execution icons are selected. According to another embodiment, the user can select the application execution icons through a menu button.

After that, in step 304, the electronic device matches an input of a first application to an output of a second application according to a user's input. Alternately, the electronic device matches an output of the first application to an input of the second application according to a user's input.

For instance, the user drags a first application execution icon and drops the first application execution icon on a second application execution icon such that the first application execution icon is partially or fully overlapped with the second application execution icon (referring to FIG. 6A below). The drag is a motion of selecting and dragging an object, and the drop is a motion of putting a dragged icon down in a desired location.

In another instance, the user can use a gesture command of dragging the first application execution icon and then tapping the second application execution icon with the first application execution icon at least once or more (referring to FIG. 6B below).

However, in the present disclosure, the motion of dragging one icon and dropping one icon on another icon or the motion of dragging one icon and then tapping another icon with one icon does not intend to limit the spirit and scope of the disclosure. It is obvious that other various methods and gesture commands can be used. For example, the user can match an output of the first application to an input of the second application through a menu button.

After that, in step 306, the electronic device creates an application convergence icon in which the input of the first application and the output of the second application have been matched to each other. Here, the application convergence icon can be an icon of a state in which the first application execution icon and the second application execution icon are stuck or overlapped with each other. Alternately, the application convergence icon can be a new icon selected by the user apart from the first application execution icon and the second application execution icon.

After that, the electronic device executes the application convergence icon in step 308. In step 310, when an input event occurs through the first application by the user, the electronic device displays an input object of the first application by using the second application. Here, the input object of the first application is information corresponding to a user input. For example, the input object can be position information of a touched point when the user touches any one point on a map application, or can be the calculation result of a calculator application and the like.

For example, when the user touches the application convergence icon, the whole screen is divided into a first screen and a second screen, and a first application execution screen is displayed on the first screen, and a second application execution screen is displayed on the second screen (referring to FIG. 8). At this time, if the user performs a motion of inputting a text or touching a point on one screen through the first application, information about a corresponding input object of the first application is displayed through the second application.

Next, the electronic device terminates the procedure of the present disclosure.

In FIG. 3 above, a description has been made for a process of selecting a first application and a second application and then, matching an input of the first application to an output of the second application. Alternatively, in another embodiment, the present disclosure can perform a process in which a user drags a first application execution icon on a screen and drops the first application execution icon on a second application execution icon or taps the first application execution icon to the second application execution icon, directly without performing a process of selecting the first application and the second application (referring to FIGS. 5A and 5B below).

According to further embodiment, the present disclosure can select at least two or more applications through corresponding user input or menu selection and then, display the executed two or more applications on divided screens, without a process of matching an input of a first application to an output of a second application in FIG. 3 above. At this time, the screen is divided in proportion to the number of the selected and executed applications.

FIG. 4 illustrates a history view screen and a wallpaper screen according to one embodiment of the present disclosure.

Figure 4B:
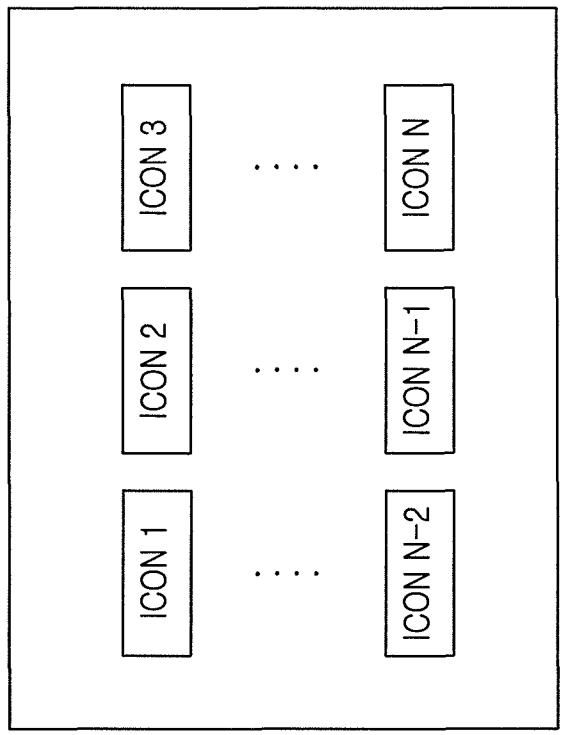
FIGS. 4A and 4B illustrate diagrams for a history view screen and a wallpaper screen according to embodiments of the present disclosure.
Figure 4A:
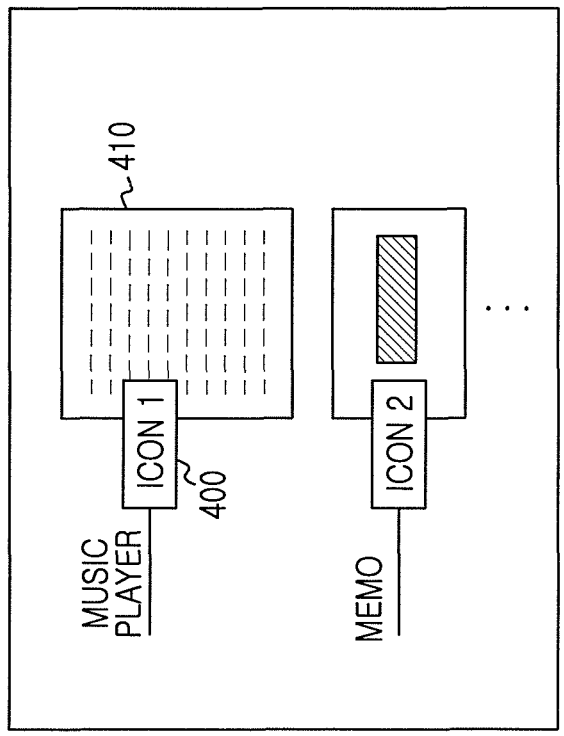

Referring to FIG. 4, previously executed applications are arranged and displayed on the history view screen (FIG. 4A), and application execution icons (i.e., icon 1, icon 2, icon 3, . . . , icon N-2, icon N-1, and icon N) are arranged and displayed on the general wallpaper screen (FIG. 4B).

Together with an application execution icon (i.e., icon 1) 400, a previous execution screen of the previously executed application displayed on the history view screen is displayed in a thumbnail form 410. And, when a user touches the previously executed application on the history view screen, the touched previously executed application is displayed together with previous work content. When the user touches the application execution icon on the wallpaper screen, an application corresponding to the touched application execution icon is displayed aside from the previous work content.

FIG. 5 illustrates an example of moving an application execution icon in order to match an input of an application to an output of another application on a history view screen and a wallpaper screen according to one embodiment of the present disclosure.

Figure 5B:
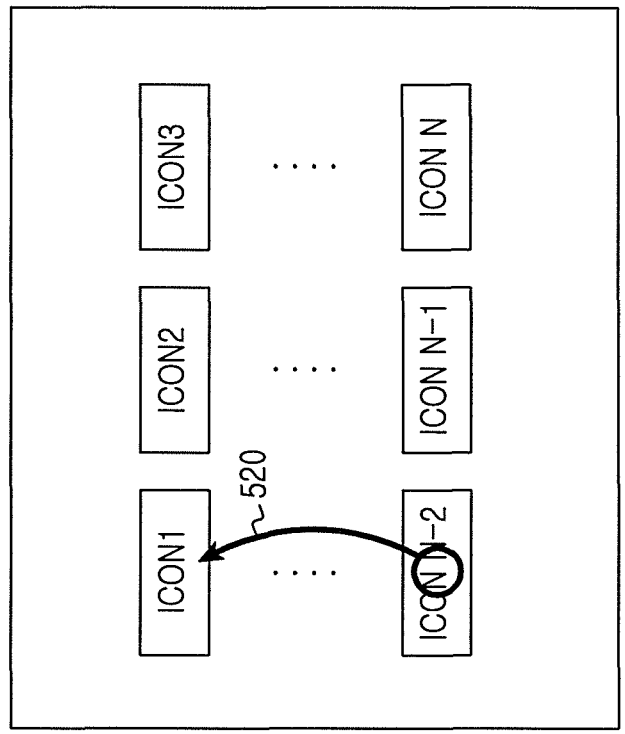
FIGS. 5A and 5B illustrate examples of moving an application execution icon in order to match an input of an application to an output of another application on a history view screen and a wallpaper screen according to embodiments of the present disclosure.
Figure 5A:
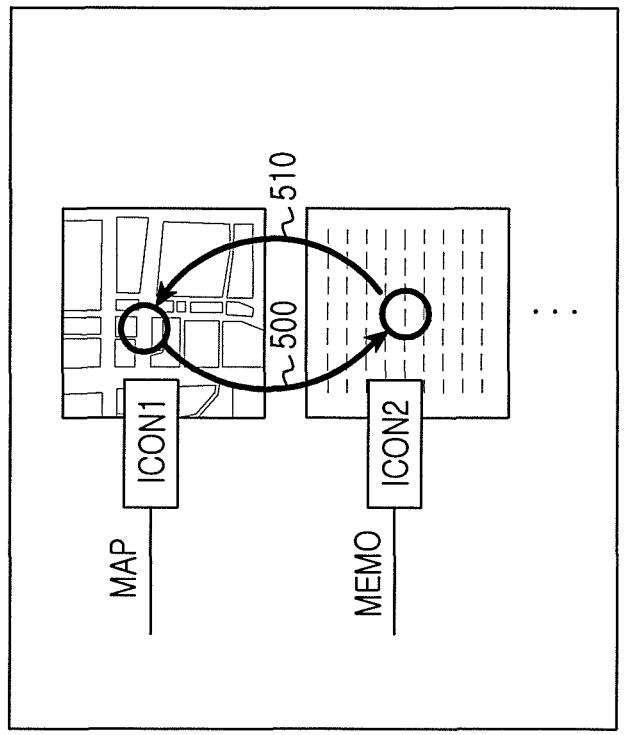

Referring to FIG. 5, a map application and a memo application, which have been previously executed, are displayed on the history view screen. At this time, the previous work content or last output states of the map application and the memo application are displayed together with icons (FIG. 5A). Here, when a user desires to match an input of the map application to an output of the memo application, the user selects and then drags a first icon (i.e., icon 1) of a form of a combination of a map application execution icon image and a map application thumbnail icon image and drops the first icon on a second icon (i.e., icon 2) of a form of a combination of a memo application execution icon and a memo application thumbnail icon (500). Alternately, the user selects and then drags a second icon (i.e., icon 2) of a form of a combination of a memo application execution icon image and a memo application thumbnail icon image and drops the second icon on a first icon (i.e., icon 1) of a form of a combination of a map application execution icon and a map application thumbnail icon (510).

According to another embodiment, the motion for matching the input of the application to the output of another application can be a motion of dragging one icon and then tapping one icon to another icon, instead of a motion of drag-and-drop.

If the user clicks the second icon of the form of the combination of the memo application execution icon and the memo application thumbnail icon, the memo application is executed and a previous execution screen showing the last work content is displayed.

On the other hand, the application execution icons for executing applications already installed are displayed on the wallpaper screen. At this time, if the user clicks the application execution icon, the previous work content or last output state of the application execution icon is not displayed, but an application initial screen is displayed (FIG. 5B). Here, when the user desires to match an input of an application to an output of another application, the user selects and then drags a first application execution icon (i.e., icon N-2) and drops the first application execution icon on a second application execution icon (i.e., icon 1) (520). Alternately, according to another embodiment, the motion for matching the input of the application to the output of another application can be a motion of dragging one icon and then tapping one icon to another icon, instead of a motion of drag-and-drop.

FIG. 6 illustrates an example of matching an input of an application to an output of another application on a history view screen and a wallpaper screen according to one embodiment of the present disclosure.

Figure 6B:
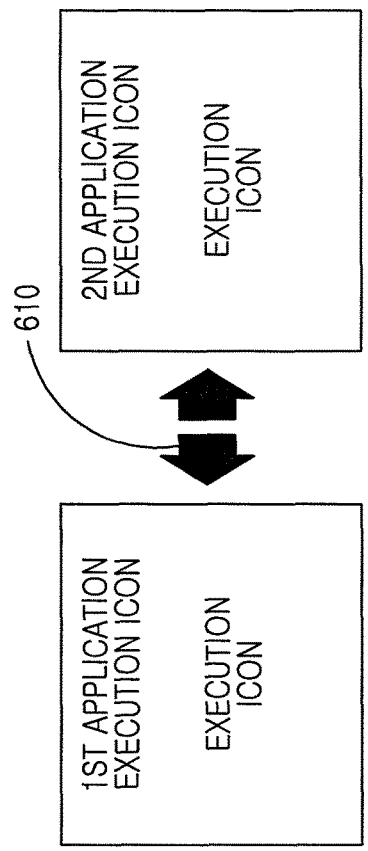
FIGS. 6A and 6B illustrate examples of matching an input of an application to an output of another application on a history view screen and a wallpaper screen according to embodiments of the present disclosure.
Figure 6A:
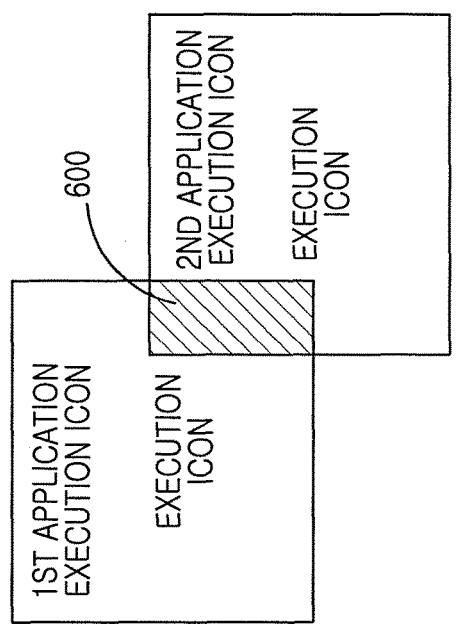

Referring to FIG. 6, to match an input of an application to an output of another application, a user selects and drags one application execution icon and then, drops the dragged application execution icon on another application execution icon (600 of FIG. 6A) such that the two applications are partially or fully overlapped with each other. Alternately, the user selects one application execution icon and then, taps the selected application execution icon to another application execution icon (610 of FIG. 6B).

Figure 7:
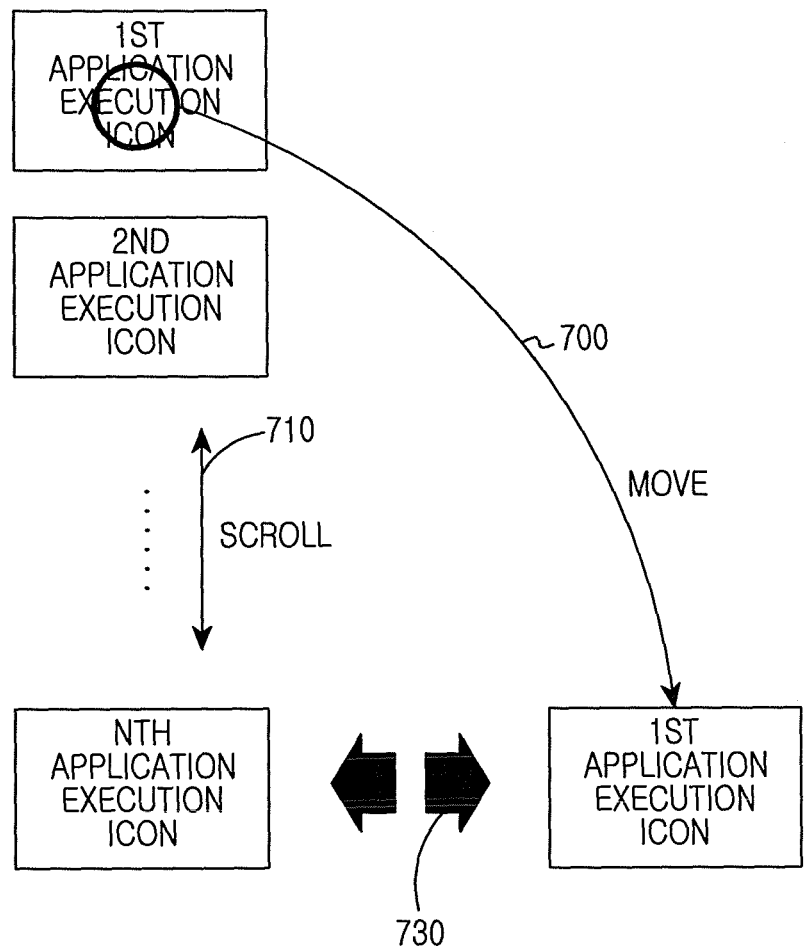
FIG. 7 illustrate an example of matching an input of an application to an output of another application, in circumstances using scroll because of the limit of the number of execution icons presented in one page according to one embodiment of the present disclosure.

FIG. 7 illustrates an example of matching an input of an application to an output of another application, in circumstances using scroll because of the limit of the number of execution icons presented in one page according to one embodiment of the present disclosure.

Referring to FIG. 7, when a user intends to move an icon by using a scroller because a first application execution icon and an Nth application execution icon cannot be displayed on one screen, he/she drags and drops the first application execution icon to move (700) the first application execution icon to other region of a corresponding screen, so as to match an input of a first application to an output of an Nth application. At this time, the moved first application execution icon is fixed in position and thus, no longer moves although using a scroller 710. According to another embodiment, with only a touch of the first application execution icon instead of dragging and dropping the first application execution icon, the user can fix the first application execution icon to the original first application execution icon position.

Next, the user scrolls down through the scroller 710 to display the Nth application execution icon and then, performs (730) a gesture motion of FIG. 6A or FIG. 6B for the fixed first application execution icon and the Nth application execution icon.

FIG. 8 illustrates an example in which an input of a map application has been matched to an output of a memo application according to one embodiment of the present disclosure.

Referring to FIG. 8, by matching an input of an application to an output of another application, related data information is real-time delivered and the input of the application is outputted through another application.

For example, if a selected point on a map of a map application and a content portion of a memo application correspond to each other to operate as an input and an output, respectively, when the Samsung Electronics is selected (800) on the map, address information (i.e., Samsung Electronics, Maetan 3-dong, Yeongtong-gu, Suwon-si, Gyeonggi-do, Korea) of the map application is automatically outputted to a memo application screen. Also, whenever the user selects another point on the map, an address corresponding to the selected point is automatically outputted to the memo application screen.

According to embodiment, an input source outputted to another application is delivered as an object and concurrently, additional information can be delivered. For example, one point on a map is delivered as an object to a memo, but information deliverable with the object can include, besides an address, real estate information such as an altitude/latitude, a price per square meter, the type of the land (i.e., a woodland or not) and the like. Here, the address delivered and shown as default is representative information. Through a separate process, a user can select the type of delivered information and change the representative information.

Meanwhile, another application receiving an object from one application and outputting the object can notify its own displayable object type to one application. In a case where another application cannot accept an object sent by one application, a predetermined information change/extraction process can be additionally carried out. For example, the information change/extraction process represents a process of, when an object of a photo form is delivered to a memo pad, extracting a text from an image of a photo or delivering information matching with the photo to the memo pad.

FIGS. 1 to 8 exemplify input/output matching between two applications. Alternatively, in another embodiment, input/output matching between an application and a widget can be performed as well. Also, matching between different programs can be performed, and even the application of parallelizable same program, pipe lining and the like can be performed. In other words, 'N' number rather than two applications can be executed in connection.

Figure 9:
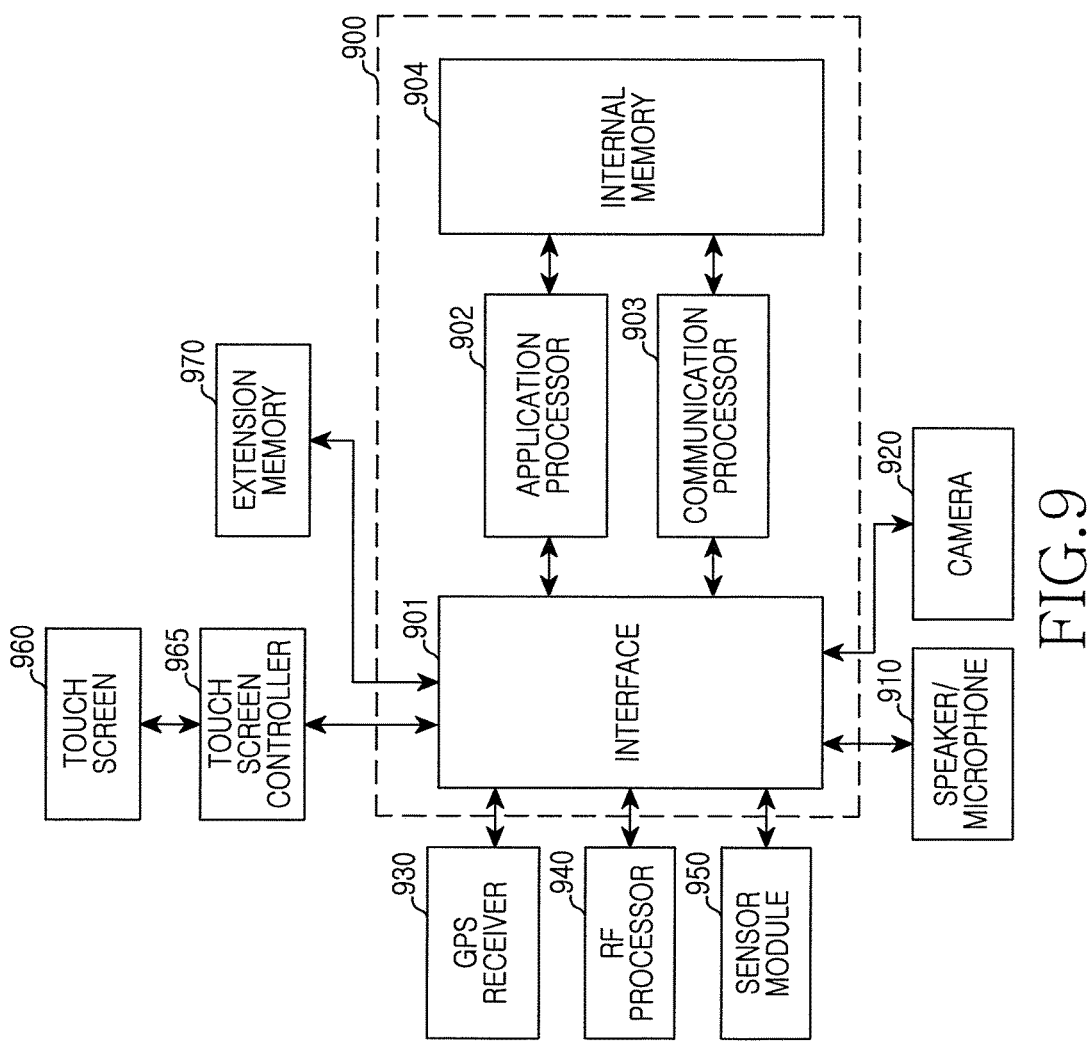
FIG. 9 illustrates a block diagram of a construction of an electronic device for matching an input of one application to an output of another application according to one embodiment of the present disclosure.

FIG. 9 illustrates a construction of an electronic device for matching an input of one application to an output of another application according to one embodiment of the present disclosure.

The electronic device can be a portable electronic device, or can be a device such as a portable terminal, a mobile phone, a mobile pad, a media player, a tablet computer, a handheld computer, or a Personal Digital Assistant (PDA). Also, the electronic device can be any portable electronic device including a device having a combination of two or more functions among these devices.

Referring to FIG. 9, the electronic device includes a controller 900, a speaker/microphone 910, a camera 920, a Global Positioning System (GPS) receiver 930, a Radio Frequency (RF) processor 940, a sensor module 950, a touch screen 960, a touch screen controller 965, and an extension memory 970.

The controller 900 can include an interface 901, one or more processors 902 and 903, and an internal memory 904. According to cases, the whole controller 900 is also called a processor. The interface 901, the application processor 902, the communication processor 903, and the internal memory 904 can be separate constituent elements or can be integrated in one or more integrated circuits.

The application processor 902 executes various software programs to perform various functions for the electronic device. The communication processor 903 performs processing and control for voice communication and data communication. Also, further to this general function, the processors 902 and 903 play even a role of executing a specific software module (i.e., an instruction set) stored in the extension memory 970 or internal memory 904 to perform specific various functions corresponding to the software module. That is, the processors 902 and 903 interwork with the software modules stored in the extension memory 970 or internal memory 904 to carry out a method for matching an input of an application to an output of another application according to one embodiment of the present disclosure.

To match an input of an application to an output of another application according to the first embodiment of the present disclosure, the application processor 902 executes a history view application, displays a list of previously used applications, selects a first application and a second application from the application list according to a user's gesture, matches an input of the first application to an output of the second application according to a user's gesture, and displays an input object of the first application by using the second application.

For example, when a user inputs a gesture command (e.g., a motion of dragging one icon and dropping one icon on another icon or a motion of dragging one icon and then tapping another icon with one icon) for matching an input of a first application to an output of a second application, the whole screen is divided into a first screen and a second screen, and a first application execution screen is displayed on the first screen and the second application execution screen is displayed on the second screen (referring to FIG. 8). At this time, information about a corresponding input object of the first application is displayed through the second application.

In another embodiment, the application processor 902 can perform a process in which a user drags a first application execution icon on a screen and drops the first application execution icon on a second application execution icon or taps the first application execution icon to the second application execution icon, directly without performing a process of selecting the first application and the second application (referring to FIGS. 5A and 5B above).

To match an input of an application to an output of another application according to the second embodiment of the present disclosure, the application processor 902 executes a history view application, displays a list of previously used applications, selects a first application and a second application form the application list according to a user's gesture, matches an input of the first application to an output of the second application according to a user's gesture, creates an application convergence icon in which the input of the first application and the output of the second application have been matched to each other and, when a user executes the application convergence icon, displays an input object of the first application by using the second application.

To match an input of an application to an output of another application according to the third embodiment of the present disclosure, the application processor 902 displays a plurality of application execution icons on a wallpaper screen, selects two application execution icons whose input and output will be matched to each other according to a user's gesture, matches the input of the first application to the output of the second application according to a user's gesture, creates an application convergence icon in which the input of the first application and the output of the second application have been matched to each other and, when an input event occurs through the first application by a user, displays an input object of the first application by using the second application. Here, the input object of the first application is information corresponding to a user input. For example, the input object can be position information of a touched point when the user touches any one point on a map application, or can be the calculation result of a calculator application and the like.

For example, when the user touches the application convergence icon, the whole screen is divided into a first screen and a second screen, and a first application execution screen is displayed on the first screen, and a second application execution screen is displayed on the second screen (referring to FIG. 8). At this time, if the user performs a motion of inputting a text or touching a point on one screen through a first application, information about a corresponding input object of the first application is displayed through the second application.

Meanwhile, other processor (not shown) can include one or more data processors, image processors, or COders/DECoders (CODECs). The data processor, the image processor, or the CODEC can be constructed separately. Or, the data processor, the image processor, or the CODEC can be constructed as several processors performing different functions. The interface 901 is connected to the touch screen controller 965 of the electronic device and the extension memory 970 thereof.

The sensor module 950 can be coupled to the interface 901 to make various functions possible. For instance, a motion sensor and an optical sensor can be coupled to the interface 901 to sense a motion of the electronic device and sense a light from the exterior, respectively. Besides this, a positioning system and other sensors such as a temperature sensor, a biological sensor and the like can be connected to the interface 901 to perform their related functions.

The camera 920 can be coupled with the sensor module 950 through the interface 901 to perform a camera function such as photo and video clip recording.

The RF processor 940 performs a communication function. For example, under the control of the communication processor 903, the RF processor 940 converts an RF signal into a baseband signal and provides the baseband signal to the communication processor 903, or converts a baseband signal from the communication processor 903 into an RF signal and transmits the RF signal. Here, the communication processor 903 processes a baseband signal in various communication methods. For example, the communication method can include, though not limited to, a Global System for Mobile Communication (GSM) communication method, an Enhanced Data GSM Environment (EDGE) communication method, a Code Division Multiple Access (CDMA) communication method, a Wireless-Code Division Multiple Access (W-CDMA) communication method, a Long Term Evolution (LTE) communication method, an Orthogonal Frequency Division Multiple Access (OFDMA) communication method, a Wireless Fidelity (Wi-Fi) communication method, a WiMAX communication method or/and a Bluetooth communication method.

The speaker/microphone 910 can take charge of input and output of an audio stream, such as voice recognition, voice replication, digital recording and a telephone function. That is, the speaker/microphone 910 converts a voice signal into an electrical signal, or converts an electrical signal into a voice signal. Although not illustrated, detachable ear phone, head phone or head set can be connected to the electronic device through an external port.

In the present disclosure, the speaker/microphone 910 receives an input of a voice necessary for a video call, or outputs a voice received from a caller.

The touch screen controller 965 can be coupled to the touch screen 960. The touch screen 960 and the touch screen controller 965 can detect a touch and a motion or interruption of them, by using, although not limited to, not merely capacitive, resistive, infrared and surface acoustic wave technologies for determining one or more touch points with the touch screen 960 but also any multi-touch sensing technology including other proximity sensor arrays or other elements.

The touch screen 960 provides an input/output interface between the electronic device and a user. That is, the touch screen 960 forwards a user's touch input to the electronic device. Also, the touch screen 960 is a medium for showing to the user an output of the electronic device. That is, the touch screen 960 shows to the user a visual output. This visual output is displayed in form of a text, a graphic, a video and a combination of them.

The touch screen 960 can be various displays. For instance, the touch screen 960 can be, although not limited to, a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED) or a Flexible LED (FLED).

The GPS receiver 930 converts signals received from three artificial satellites into information of location, velocity, time and the like. For instance, the GPS receiver 930 determines distances between the artificial satellites and the GPS receiver 930 through a multiplication of the speed of light and signal arrival time, obtains accurate locations and distances of the artificial satellites, and measures a location of the electronic device in accordance with the known triangulation principle.

The extension memory 970 or the internal memory 904 can include high-speed random access memory and/or non-volatile memory such as one or more magnetic disk storage devices, one or more optical storage devices, and/or flash memory (for example, NAND, NOR).

The extension memory 970 or the internal memory 904 stores software. A software constituent element includes an Operating System (OS) software module, a communication software module, a graphical software module, a user interface software module, a Moving Picture Experts Group (MPEG) module, a camera software module, one or more application software modules and the like. Also, the module, a software constituent element, can be expressed as a set of instructions. Therefore, the module is also expressed as an instruction set. The module is also expressed as program.

The OS software includes various software constituent elements controlling general system operation. This control of the general system operation means, for example, memory management and control, storage hardware (device) control and management, power control and management and the like. The OS software performs even a function of making smooth communication between various hardware (devices) and software constituent elements (modules).

The communication software module enables communication with other electronic devices such as a personal computer, a server and/or a portable terminal and the like, through the RF processor 940. And, the communication software module is constructed in a protocol structure corresponding to a corresponding communication scheme.

The graphical software module includes various software constituent elements for providing and displaying a graphic on the touch screen 960. The term 'graphic' is used as meaning including a text, a web page, an icon, a digital image, a video, an animation and the like.

The user interface software module includes various software constituent elements associated with a user interface. The user interface software module includes information about how a state of the user interface is changed or in which conditions the change of the state of the user interface is carried out, and the like.

The camera software module includes a camera-related software constituent element enabling camera related processes and functions. The application module includes a browser, an electronic mail (e-mail), an instant message, word processing, keyboard emulation, an address book, a touch list, a widget, Digital Right Management (DRM), voice recognition, voice replication, a position determining function, a location based service and the like. The memories 970 and 904 can include additional modules (i.e., instructions) besides the modules mentioned above. Or, the memories 970 and 904 may not use some modules (i.e., instructions) according to need.

In relation to the present disclosure, an application module includes instructions for matching an input of an application to an output of another application according to the present disclosure (referring to FIGS. 1 to 3 above).

According to the first embodiment of the present disclosure, an instruction executes a history view application, displays a list of previously used applications, selects a first application and a second application from the application list according to a user's gesture, matches an input of the first application to an output of the second application according to a user's gesture, and displays an input object of the first application by using the second application.

For example, when a user inputs a gesture command (e.g., a motion of dragging one icon and dropping one icon on another icon or a motion of dragging one icon and then tapping another icon with one icon) for matching an input of a first application to an output of a second application, the whole screen is divided into a first screen and a second screen, and a first application execution screen is displayed on the first screen and the second application execution screen is displayed on the second screen (referring to FIG. 8). At this time, information about a corresponding input object of the first application is displayed through the second application.

In another embodiment, the instruction can perform a process in which a user drags a first application execution icon on a screen and drops the first application execution icon on a second application execution icon or taps the first application execution icon to the second application execution icon, directly without performing a process of selecting the first application and the second application (referring to FIGS. 5A and 5B above).

According to the second embodiment of the present disclosure, an instruction executes a history view application, displays a list of previously used applications, selects a first application and a second application form the application list according to a user's gesture, matches an input of the first application to an output of the second application according to a user's gesture, creates an application convergence icon in which the input of the first application and the output of the second application have been matched to each other and, when a user executes the application convergence icon, displays an input object of the first application by using the second application.

According to the third embodiment of the present disclosure, an instruction displays a plurality of application execution icons on a wallpaper screen, selects two application execution icons whose input and output will be matched to each other according to a user's gesture, matches the input of the first application to the output of the second application according to a user's gesture, creates an application convergence icon in which the input of the first application and the output of the second application have been matched to each other and, when an input event occurs through the first application by a user, displays an input object of the first application by using the second application. Here, the input object of the first application is information corresponding to a user input. For example, the input object can be position information of a touched point when the user touches any one point on a map application, or can be the calculation result of a calculator application and the like.

For example, when the user touches the application convergence icon, the whole screen is divided into a first screen and a second screen, and a first application execution screen is displayed on the first screen, and a second application execution screen is displayed on the second screen (referring to FIG. 8). At this time, if the user performs a motion of inputting a text or touching a point on one screen through a first application, information about a corresponding input object of the first application is displayed through the second application.

Also, various functions of the electronic device according to the present disclosure mentioned above or to be mentioned below can be executed by hardware including one or more processing and/or Application Specific Integrated Circuits (ASICs), and/or software, and/or a combination of them.

As described above, exemplary embodiments of the present disclosure have an advantage of being capable of providing a convenient user experience between various applications, by matching an input of an application to an output of another application.

Also, the exemplary embodiments of the present disclosure provide a better use environment to users, through operation in an application history view providing information about applications already installed in a memory space, a better application convergence method, and input/output matching for multitasking.

While the disclosure has been shown and described with reference to certain preferred embodiments thereof, it will be understood by those skilled in the art that various changes in form and details may be made therein without departing from the spirit and scope of the disclosure as defined by the appended claims.

What is claimed is:

1. A method in an electronic device, the method comprising:
displaying a list including icons of previously executed applications on a part of a screen of the electronic device;
when an input for dragging-and-dropping an icon of a first application included in the list to a region where the list is not displayed is detected, moving the icon of the first application to the region;
when an input for scrolling the list to search an icon of a second application is detected, scrolling the list while the icon of the first application is fixed;
when an input for dragging-and-dropping the icon of the first application included in the region to the icon of the second application included in the list is detected, matching an input of a first application to an output of a second application;
in response to detecting that the matching of the input of the first application and the output of the second application is completed, executing the first application and the second application, dividing a whole screen, and displaying the first application and the second application on the divided screens, respectively; and
displaying input object information of the first application through the second application, based on the matched input of the first application and output of the second application.

2. The method of claim 1, further comprising:
combining the icon of the first application with the icon of the second application; and
creating a matching icon indicating that the input of the first application and the output of the second application have been matched to each other.

3. The method of claim 2, further comprising:
when the matching icon is touched, executing the first application and the second application;
dividing the whole screen, and displaying the first application and the second application on the divided screens, respectively;
when an input event occurs in the first application, delivering object information corresponding to the input event of the first application, to the second application; and
outputting the object information of the first application in the second application.

4. The method of claim 3, further comprising: when not capable of displaying the object information of the first application in the second application,
converting the object information of the first application into information that is supportable in the second application; and
outputting the converted information in the second application.

5. The method of claim 1, wherein the input object information of the first application is work content of the first application having been previously executed.

6. The method of claim 1, further comprising: when not capable of displaying the object information of the first application in the second application,
converting the object information of the first application into information that is supportable in the second application; and
outputting the converted information in the second application.

7. An electronic device comprising:
a display;
one or more processors configured to:
control the display to display a list including icons of previously executed applications on a part of the display;
when an input for dragging- and dropping an icon of a first application included in the list to a region where the list is not displayed is detected, move the icon of the first application to the region;
when an input for scrolling the list to search an icon of a second application is detected, control the display to scroll the list while the icon of the first application is fixed;

when an input for dragging-and-dropping the icon of the first application included in the region to the icon of the second application included in the list is detected, match an input of a first application to an output of a second application in response to a predefined input;

in response to detecting that the matching of the input of the first application and the output of the second application is completed, execute the first application and the second application, control the display to divide a whole screen, and control the display to display the first application and the second application on the divided screens, respectively; and control the display to display input object information of the first application through the second application, based on the matched input and output of the first and second applications.

8. The electronic device of claim 7, wherein the one or more processors is further configured to:

combine a first application execution icon with a second application execution icon; and create a matching icon indicating that the input of the first application and the output of the second application have been matched to each other.

9. The electronic device of claim 8, wherein the one or more processors is further configured to:

control the display to divide the whole screen, and display the first application and the second application on the divided screens, respectively;

when an input event occurs in the first application, deliver object information corresponding to the input event of the first application, to the second application; and output the object information of the first application in the second application.

10. The electronic device of claim 9, wherein the one or more processors is further configured to:

convert the object information of the first application into information that is supportable in the second application; and output the converted information in the second application.

11. The electronic device of claim 7, wherein the input object information of the first application is work content of the first application having been previously executed.

12. The electronic device of claim 7, wherein the one or more processors is further configured to:

when not capable of displaying the object information of the first application in the second application, convert the object information of the first application into information that is supportable in the second application; and output the converted information in the second application.

* * * * *